Patented May 19, 1942

2,283,388

UNITED STATES PATENT OFFICE 2,283,388

ANTIOXIDANT

Philip T. Paul, Naugatuck, and Louis H. Howland, Cheshire, Conn., assignors to United States Rubber Company, New York, N. Y., a corporation of New Jersey No Drawing. Application June 28, 1939, Serial No. 281,530

4 Claims. (Cl. 260—800)

This invention relates to a new class of antioxidants or age-resisters for organic substances which tend to deteriorate by absorption of oxygen from the air, e. g. rubber or allied gums, unsaturated fatty oils, such as unsaturated vegetable oils, essential oils, petroleum oils and their derivatives such as gasolines, soaps, aldehydes, synthetic resins, turpentine, insecticides such as derris root, cube root and pyrethrum, and the like. The materials are exceptionally useful as flex-improvers or anti-flex cracking agents for vulcanized rubber, such as tire treads, which undergo repeated strains during use.

According to the invention the organic substance is incorporated with an arylamino dihydrobenzofurane. The general formula is:

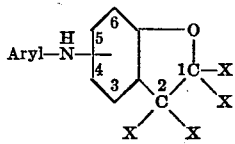

wherein

Aryl refers to an aryl nucleus of the benzene, naphthalene or biphenyl series.
X is an alkyl group or hydrogen.
N, H, O and C represent nitrogen, hydrogen, oxygen and carbon respectively.

The aryl nucleus may contain as substituents alkyl, aryl, alkoxy, aryloxy, alkenyl, alkenyloxy, halogen, secondary alkyl amino, tertiary alkyl amino, mercapto, alkyl mercapto, etc.

As specific examples of said formula, the following are given:

3-phenylamino 1,2-dihydrobenzofurane
4-phenylamino 1,2-dihydrobenzofurane
5-phenylamino 1,2-dihydrobenzofurane
6-phenylamino 1,2-dihydrobenzofurane
3-naphthylamino 1,2-dihydrobenzofurane
3-biphenylamino 1,2-dihydrobenzofurane
4-naphthylamino 1,2-dihydrobenzofurane
5-biphenylamino 1,2-dihydrobenzofurane
3-anisylamino 1,2-dihydrobenzofurane
4-(p-chlorophenyl) amino 1,2 - dihydrobenzofurane
5-(p-tolyl) amino 1,2-dihydrobenzofurane
6-(p-cumyl) amino 1,2-dihydrobenzofurane
3-(p-hydroxy phenyl) amino 1,2-dihydrobenzofurane
4-(p-phenetidyl) 1,2-dihydrobenzofurane
4-phenylamino 1,1-dimethyl 1,2 - dihydrobenzofurane
4-phenylamino 1,2-dimethyl 1,2 - dihydrobenzofurane
4-phenylamino 2,2-dimethyl 1,2 - dihydrobenzofurane
4-phenylamino 1-methyl 1,2-dihydrobenzofurane
4-phenylamino 2-methyl 1,2-dihydrobenzofurane
4-phenylamino 1,1-diethyl 1,2 - dihydrobenzofurane
4-phenylamino 1,2-dipropyl 1,2-dihydrobenzofurane The following examples illustrate the preparation of the chemicals (parts are by weight):

Example I 4-anilino 1,1-dimethyl 1,2-dihydrobenzofurane may be obtained as the alkali insoluble portion of the heat reaction product of 4-methallyloxy diphenylamine. Thus 4-methallyloxy diphenylamine was heated in a sealed tube overnight at 212° C. and the product so obtained was cleaned up by a vacuum distillation. The distillate was dissolved in benzene and washed several times with a potassium hydroxide solution having the composition 35 parts potassium hydroxide, 25 parts water, 90 parts methyl alcohol. The benzene solution was dried and after removal of the solvent, the residue was vacuum distilled B. P. 175–185° C./2 mm. On standing it crystallized. Recrystallized from ligroin. M. P. 65–67° C.

Analysis

| Nitrogen: | Per cent |
|---|---|
| Theory | 5.86 |
| Found | 5.96 |

Example II 4-anilino 1-methyl 1,2-dihydrobenzofurane was prepared in a similar manner from 4-allyloxy diphenylamine. However, to increase the yield, the heat reaction product was stirred for about five hours with five times its weight of 85% phosphoric acid. 4-anilino 1-methyl 1,2-dihydrobenzofurane was obtained as an amber oil. It has the following physical characteristics:

Boiling point_____ 170–175° C./2 mm.
Index of refraction_____ 1.6309
Density_____ 1.14

Analysis

| Nitrogen: | Per cent |
|---|---|
| Theory | 6.23 |
| Found | 6.18 |

Example III

The 4-anilino 1-methyl 1,2-dihydrobenzofurane obtained by condensing 4-acetylamino 1-methyl 1,2-dihydrobenzofurane (Claisen Ann. 418, 69 (1919)) with iodobenzene and then hydrolyzing the acetyl group with alcoholic potassium hydroxide has identical properties to Example II.

The effectiveness of chemicals of this class for retarding the deterioration of rubber is illustrated by the results of standard aging tests on commercial rubber compounds. For example, tests were made on the following tread compounds (parts are by weight):

Master batch

| | |
|---|---|
| Smoked sheets | 100 |
| Carbon black | 45 |
| Zinc oxide | 5 |
| Pine tar | 3.50 |
| Zinc salt of cocoanut oil acids | 3.50 |
| Sulfur | 3.00 |
| Mercaptobenzothiazole | 1.00 |
| | 161.00 |

To this master batch, 4-anilino, 1,1-dimethyl 1,2-dihydrobenzofurane and 4-anilino 1-methyl 1,2-dihydrobenzofurane were added in the proportion of 1 part to 100 parts of rubber. Cures were made for 45, 60, 75 and 90 minutes at 30 pounds steam. The percent remaining tensile before and after aging 96 hours under 300 pounds oxygen at 70° C. are as follows:

| | Control | Chemical I |
|---|---|---|
| Unaged | 100 | 100 |
| Aged | 45 | 64 |

| | | Chemical II |
|---|---|---|
| Unaged | | 100 |
| Aged | | 67 |

Chemical I—4-anilino 1,1-dimethyl 1,2-dihydrobenzofurane.
Chemical II—4-anilino 1-methyl 1,2-dihydrobenzofurane.

The present chemicals may be used for various purposes, for example, as insecticides, pharmaceuticals, intermediates for the preparation of other chemicals, high pressure lubricants, gasoline inhibitors, rubber antioxidants, etc.

Additional examples within the scope of the present invention are:

I. 4,4' di (1,1-dimethyl 1,2-dihydrobenzofurane) amine

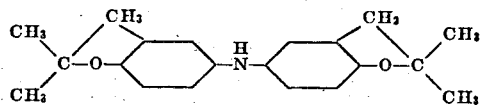

II. di 4,4' (1, methyl 1,2-dihydrobenzofurane) amine

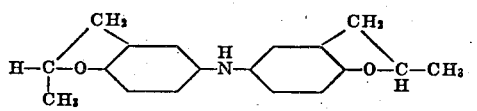

III. 4 ((p-anilino) anilino) 1,1-dimethyl 1,2-dihydrobenzofurane

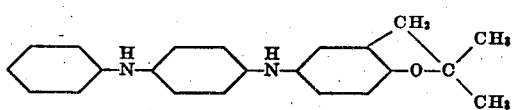

IV. 4 ((p-anilino) anilino) 1-methyl 1,2-dihydrobenzofurane

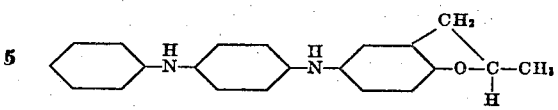

V. N,N' di-4,4' (1,1-dimethyl 1,2-dihydrobenzofurane) p-phenylene diamine

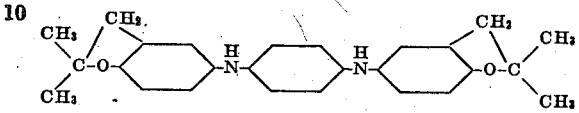

The invention may be applied to the preservation of broadly natural rubber compositions as well as artificially prepared rubber compositions including reclaimed rubbers, and latices of such rubber compositions.

It is also to be understood that other desired filling and compounding ingredients may be incorporated along with the preservative, for example, in the case of rubber, there may be incorporated other accelerators, softeners, etc.

The antioxident may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surface of vulcanized or unvulcanized rubber goods.

Having thus described our invention, what we claim and desire to protect by Letters Patent is:

1. A method of retarding the deterioration of an organic substance which tends to deteriorate by absorption of oxygen from the air which comprises incorporating therein an arylamino dihydrobenzofurane in which the arylamino group is a secondary arylamino group attached to the benzene ring of the benzofurane.

2. A method of retarding the deterioration of an organic substance which tends to deteriorate by absorption of oxygen from the air which comprises incorporating therein an arylamino dihydrobenzofurane in which the furane nucleus contains at least one C-alkyl group and in which the arylamino group is a secondary arylamino group attached to the benzene ring of the benzofurane.

3. A method of preserving rubber which comprises incorporating therein a 4-phenylamino 1-alkyl 1,2-dihydrobenzofurane.

4. The vulcanization product of a rubber composition containing an arylamino dihydrobenzofurane in which the arylamino group is a secondary arylamino group attached to the benzene ring of the benzofurane.

PHILIP T. PAUL.
LOUIS H. HOWLAND.